US012770808B2

(12) United States Patent
Shu

(10) Patent No.: US 12,770,808 B2

(45) Date of Patent: Oct. 20, 2026

(54) CONJOINED KEY STRUCTURE AND ELECTRONIC DEVICE

(71) Applicant: AAC Acoustic Technologies (Shanghai) Co., Ltd., Shanghai (CN)

(72) Inventor: Chengxiang Shu, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 293 days.

(21) Appl. No.: 18/633,565

(22) Filed: Apr. 12, 2024

(65) Prior Publication Data

US 2025/0182983 A1 Jun. 5, 2025

Related U.S. Application Data

(63) Continuation of application No. PCT/CN2023/136466, filed on Dec. 5, 2023.

(51) Int. Cl.
*H01H 13/14* (2006.01)
*H01H 13/20* (2006.01)

(52) U.S. Cl.
CPC ............ *H01H 13/14* (2013.01); *H01H 13/20* (2013.01)

(58) Field of Classification Search
CPC .......... H01H 13/14; H01H 13/20; H01H 3/12; H01H 3/122; H01H 13/50; H01H 13/506; H01H 13/52; H01H 2201/02
See application file for complete search history.

(56) References Cited

U.S. PATENT DOCUMENTS

| | | | | |
|---|---|---|---|---|
| 12,411,564 B2 * | 9/2025 | Shu | ..................... | G06F 3/03547 |
| 2024/0341197 A1 * | 10/2024 | Shu | ...................... | H10N 30/302 |
| 2025/0166942 A1 * | 5/2025 | Shu | ........................ | H10N 30/80 |
| 2025/0192779 A1 * | 6/2025 | Shu | ...................... | H03K 17/964 |

* cited by examiner

*Primary Examiner* — Lheiren Mae A Caroc

(74) *Attorney, Agent, or Firm* — Wiersch Law Group

(57) ABSTRACT

A conjoined key structure and an electronic device is described. The conjoined key structure includes a support frame with an accommodating groove, a first and second piezoelectric transducers fixedly accommodated in the accommodating groove and spaced from each other, pressure sensors fixedly accommodated in the accommodating groove and located between the first and second piezoelectric transducers, and a key covering the support frame and the accommodating groove. The key and the support frame are elastically connected. Two opposite sides of the first piezoelectric transducer respectively abut against the support frame and the key. Two opposite sides of the second piezoelectric transducer respectively abut against the support frame and the key. Two opposite sides of the pressure sensors respectively abut against the support frame and the key. The conjoined key structure can accurately determine touch actions of fingers, improving the recognition accuracy and consistency of the conjoined key structure.

9 Claims, 5 Drawing Sheets

A–A

B-B

CONJOINED KEY STRUCTURE AND ELECTRONIC DEVICE

CROSS REFERENCE TO RELATED APPLICATIONS

The present application a continuation of PCT Patent Application No. PCT/CN2023/136466, entitled "CONJOINED KEY STRUCTURE AND ELECTRONIC DEVICE," filed Dec. 5, 2023, which is incorporated by reference herein in its entirety.

TECHNICAL FIELD

Embodiments of the present disclosure relate to the technical field of keys, and in particular, to a conjoined key structure and an electronic device.

BACKGROUND

Piezoelectric ceramic devices, applied to components such as keys of electronic devices including mobile phones, watches, tablet computers and the like to achieve sensing and vibration functions, are called solid-state keys, which have achieved commendable user experience and market response.

When a solid-state key form is applied to a conjoined key (e.g. a conjoined key with a volume increasing key and a volume decreasing key), the conjoined key has a structure as follows: two arch-shaped or cymbal-shaped piezoelectric transducers and a key are fixed using glue, screws or the like to achieve a one-to-one correspondence. In such way, arch-shaped or cymbal-shaped upper and lower surfaces are driven to output displacement in a telescopic manner by virtue of an inverse piezoelectric effect of ceramics, such that vibration is transmitted to the key. Similarly, due to the piezoelectric effect of ceramic materials, when a force is applied to the key, electromotive potential is generated at two ends of the transducer, and the magnitude of the applied force is determined based on the magnitude of the electromotive potential.

When the form of solid-state keys of related technologies is applied to conjoined keys, interference is present between two conjoined keys, to be specific, pressing one side causes displacement and pressure on the other side, as a result, touch actions of fingers cannot be accurately determined.

Therefore, it is desired to provide a novel dual-piezoelectric key structure to solve the above problems.

SUMMARY

Embodiments of the present disclosure are intended to provide a conjoined key structure and an electronic device, so as to solve the problem that touch actions of fingers cannot be accurately determined by conjoined keys in related technologies.

According to a first aspect, embodiments of the present disclosure provide a conjoined key structure. The conjoined key structure includes a support frame with an accommodating groove, a first piezoelectric transducer and a second piezoelectric transducer that are fixedly accommodated in the accommodating groove and spaced from each other, a pressure sensor fixedly accommodated in the accommodating groove and located between the first piezoelectric transducer and the second piezoelectric transducer, and a key arranged on the support frame in a covering manner and covering the accommodating groove; the key and the support frame are elastically connected; two opposite sides of the first piezoelectric transducer respectively abut against the support frame and the key; two opposite sides of the second piezoelectric transducer respectively abut against the support frame and the key; and two opposite sides of the pressure sensor respectively abut against the support frame and the key.

As an improvement, the pressure sensor is arranged in a manner of facing a middle position of the key, and the first piezoelectric transducer and the second piezoelectric transducer are arranged at an equal interval on two opposite ends of the pressure sensor.

As an improvement, a plurality of pressure sensors are provided; the plurality of pressure sensors are arranged at an equal interval; and the plurality of pressure sensors are all located between the first piezoelectric transducer and the second piezoelectric transducer.

As an improvement, the pressure sensor is any one of piezoelectric sensor, strain sensor, optical sensor, magnetic sensitive sensor, capacitive sensor, inductive sensor, and proximity sensor.

As an improvement, the first piezoelectric transducer includes a flat piezoelectric ceramic plate, as well as a first piezoelectric plate and a second piezoelectric plate that are respectively arch-shaped or cymbal-shaped; the first piezoelectric plate and the second piezoelectric plate are respectively located at upper and lower sides of the piezoelectric ceramic plate; two ends of the first piezoelectric plate are respectively fixed to two ends of the piezoelectric ceramic plate; a middle region of the first piezoelectric plate is fixed to one side of the support frame close to the key; two ends of the second piezoelectric plate are respectively fixed to two ends of the piezoelectric ceramic plate; a middle region of the second piezoelectric plate is fixed to one side of the key close to the support frame; and the second piezoelectric transducer is the same as the first piezoelectric transducer in structure.

As an improvement, the side of the support frame close to the key protrudes to form a first strip-shaped support block; one side of the first strip-shaped support block close to the key protrudes to form a first limiting column; a first limiting hole extending through the first piezoelectric plate is arranged at a position of the first piezoelectric plate corresponding to the first limiting column; the first limiting column is inserted into the first limiting hole; the side of the key close to the support frame protrudes to form a second strip-shaped support block; one side of the second strip-shaped support block close to the support frame protrudes to form a second limiting column; a second limiting hole extending through the second piezoelectric plate is arranged at a position of the second piezoelectric plate corresponding to the second limiting column; and the second limiting column is inserted into the second limiting hole.

As an improvement, the support frame includes a base plate and an extending portion that is formed by protruding and extending from the periphery of the base plate to a direction close to the key; the extending portion and the base plate are jointly enclosed to form the accommodating groove; and two ends of the key are respectively fixed to one side of the extending portion far away from the base plate and are elastically connected to the extending portion.

As an improvement, the key includes a strip-shaped body portion, two elastic portions that respectively sinuously bend and extend from two ends of the strip-shaped body portion and are fixed to the support frame, and an abutment portion that protrudes and extends from a position of the strip-shaped body portion corresponding to the pressure sensor to a direction close to the pressure sensor; and the abutment portion abuts against the pressure sensor.

According to a second aspect, embodiments of the present disclosure provide an electronic device. The electronic device includes a housing and the conjoined key structure as described above. The key of the conjoined key structure extends through a side surface of the housing to be exposed outside.

As an improvement, a mounting hole is formed on the side surface of the housing; the support frame is fixed to the housing; and the key extends through the mounting hole to be exposed outside.

As compared to related technologies, the conjoined key structure in the embodiments of the present disclosure is additionally provided with the a pressure sensor between the first piezoelectric transducer and the second piezoelectric transducer, such that the pressure sensor can acquire data changes of pressing forces of fingers and data changes of position and distance in touch actions and can accurately determine the touch actions of the fingers in cooperation with auxiliary signals acquired by the first piezoelectric transducer or the second piezoelectric transducer, improving recognition accuracy and consistency of the conjoined key structure.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

Figure 1:
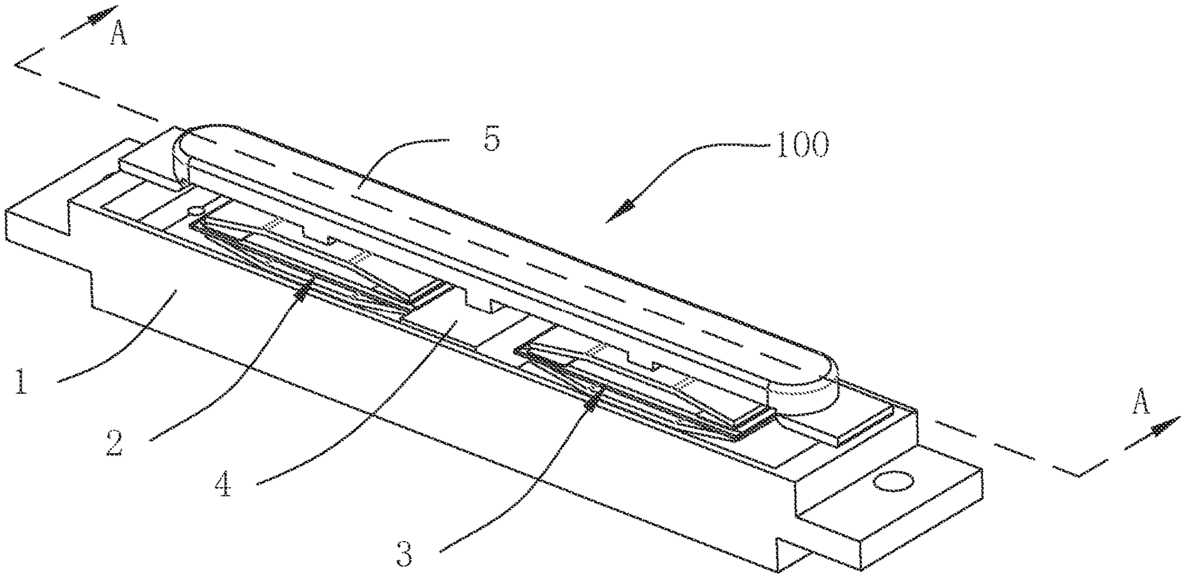
FIG. 1 is a schematic diagram illustrating a three-dimensional structure of a conjoined key structure according to an embodiment of the present disclosure.

In the figures: 100. conjoined key structure; 1. support frame; 10. accommodating groove; 11. base plate; 111. first strip-shaped support block; 112. first limiting column; 113. connecting hole; 12. extending portion; 2. first piezoelectric transducer; 21. piezoelectric ceramic plate; 22. first piezoelectric plate; 221. first limiting hole; 23. second piezoelectric plate; 231. second limiting hole; 3. second piezoelectric transducer; 4. pressure sensor; 5. key; 51. strip-shaped body portion; 511. second strip-shaped support block; 512. second limiting column; 52. elastic portion; 53. abutment portion; 200. electronic device; 201. housing; and 202. mounting hole.

DETAILED DESCRIPTION OF THE EMBODIMENTS

Unless otherwise defined, all technical and scientific terms used herein shall have the same meanings as commonly understood by a person skilled in the art to which the present disclosure belongs. The terms used in the specification of the present disclosure are used to merely describe the specific embodiments rather than to limit the present disclosure. The terms "include", "comprise", and any variation thereof in the specification and claims of the present disclosure as well as the foregoing description of drawings are intended to cover non-exclusive inclusions. The terms "first", "second", and the like in the specification and claims of the present disclosure or in the accompanying drawings are used to distinguish between different objects rather to indicate a particular order.

"Embodiment" mentioned herein means that particular features, structures, or characteristics described with reference to the embodiment may be included in at least one embodiment of the present disclosure. The word "embodiment" appearing in various places in the specification does not necessarily refer to the same embodiment or an independent or alternative embodiment that is exclusive of other embodiments. A person skilled in the art explicitly and implicitly understands that the embodiments described herein may be combined with other embodiments.

It should be noted that the descriptions "upper", "lower", "left", "right", and the like mentioned herein are described with reference to arrangement states in the accompanying drawings and should not be construed as a restrictive embodiment of the present disclosure. In addition, it should be further noted that in this specification, when an element "on" or "under" another element is indicated, it is possible that the element is directly "on" or "under" the another element, or the element is "on" or "under" the another element via an intermediate element.

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

First Embodiment

Figure 2:
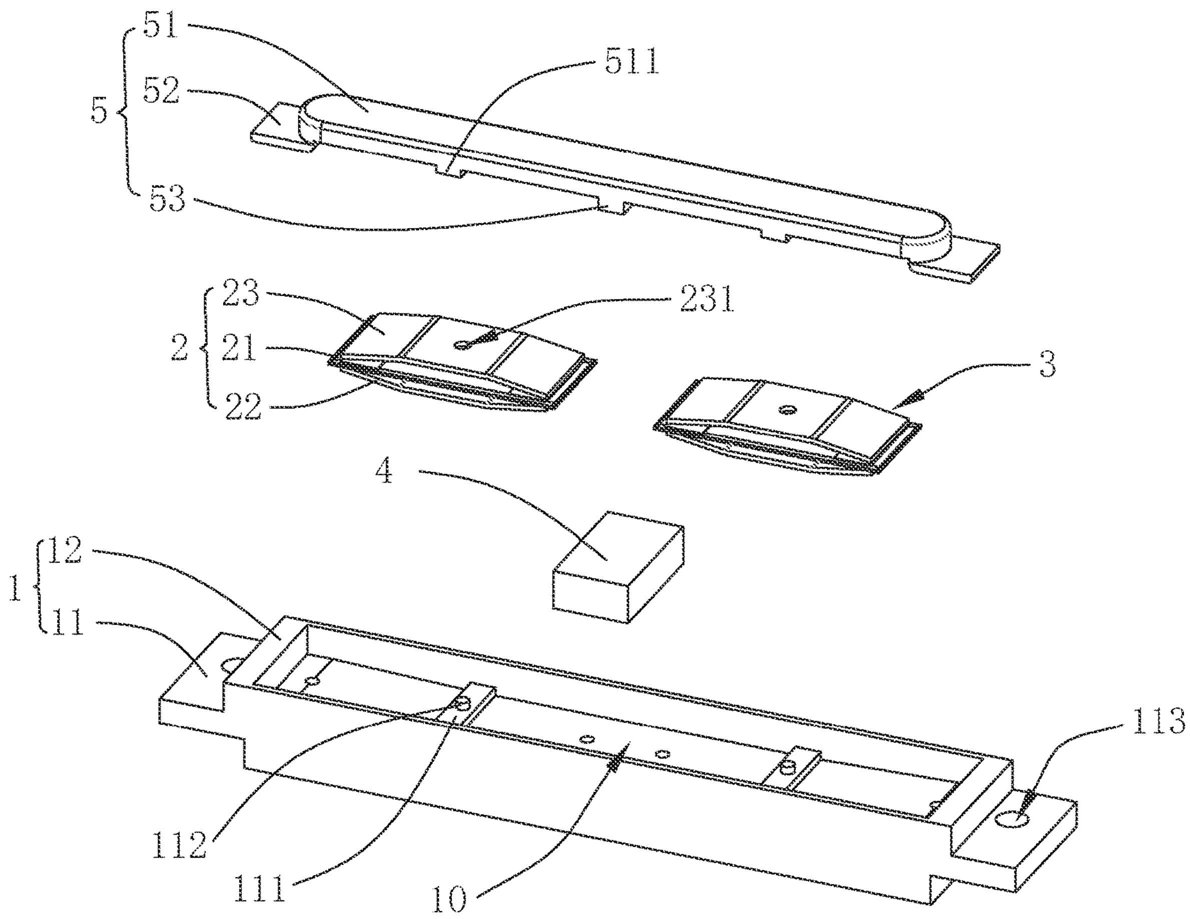
FIG. 2 is a schematic diagram illustrating an exploded structural view of a conjoined key structure according to an embodiment of the present disclosure.
Figure 3:
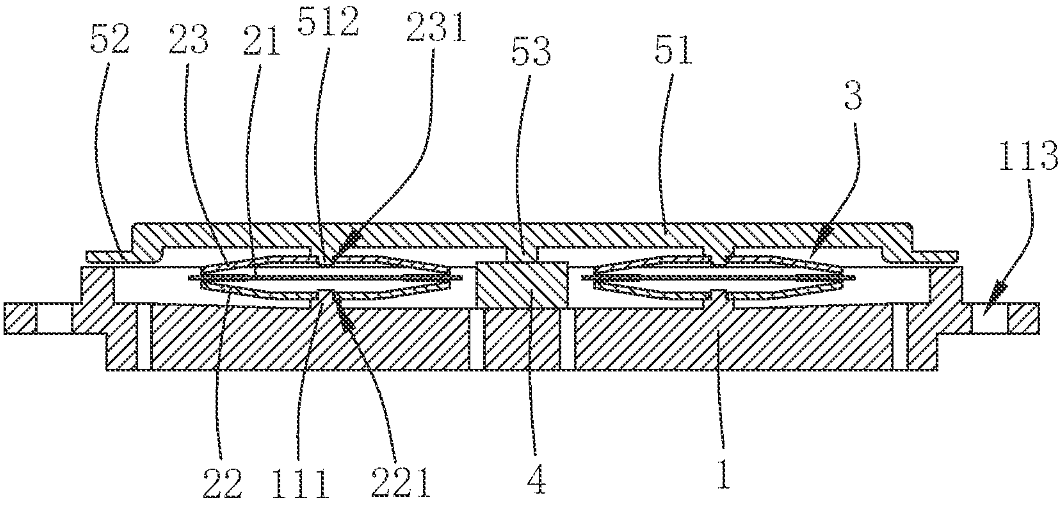
FIG. 3 is a cross-sectional view taken along line A-A in FIG. 1.
Figure 4:
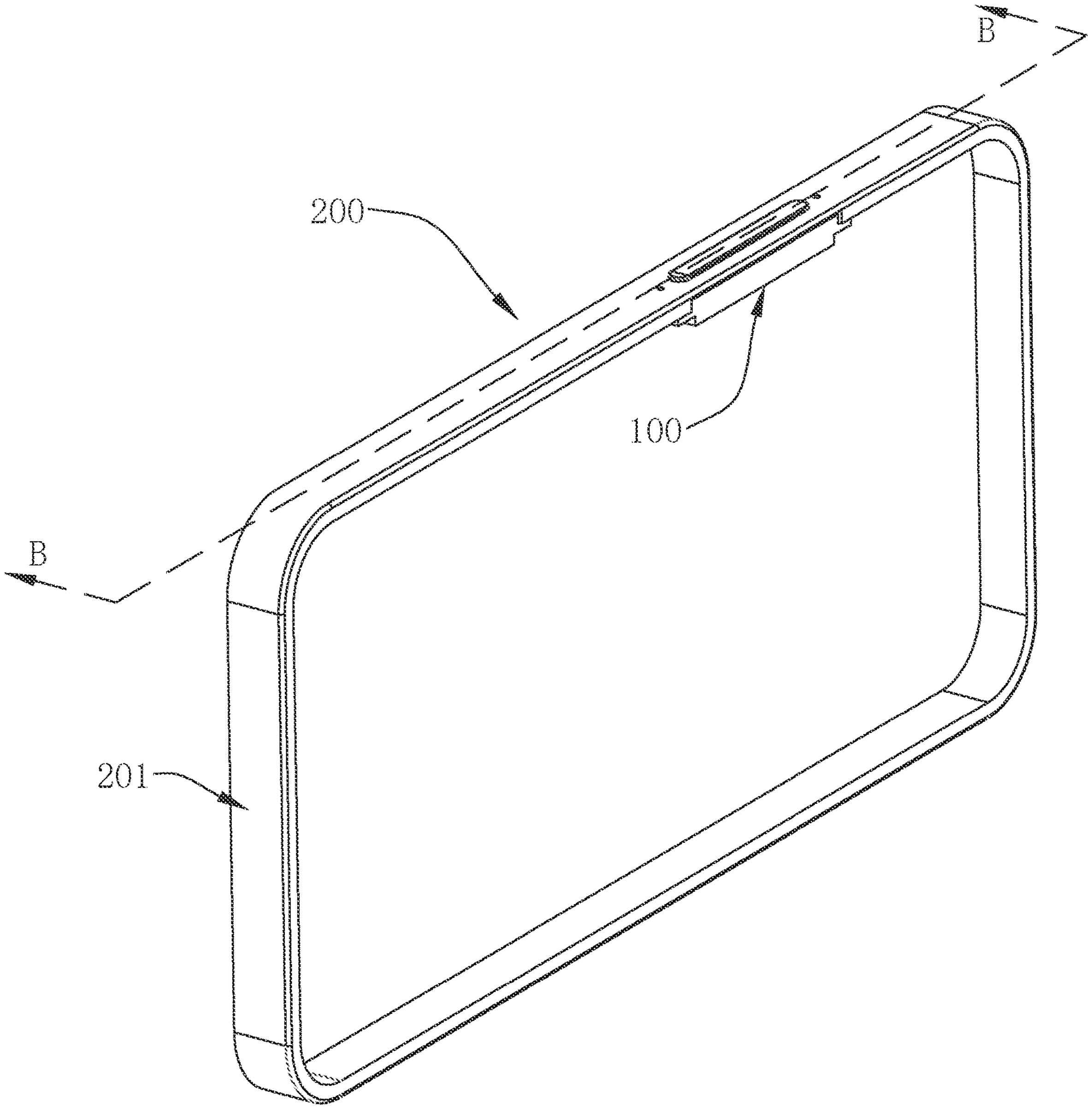
FIG. 4 is a schematic diagram illustrating a three-dimensional structure of an electronic device according to an embodiment of the present disclosure.
Figure 5:
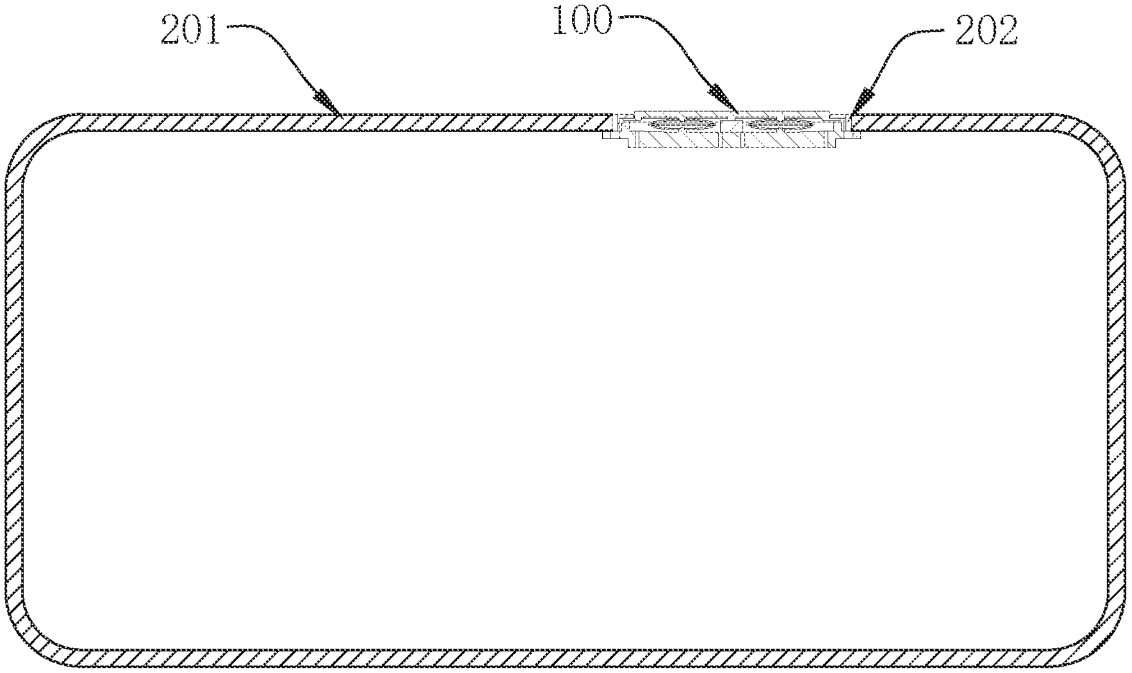
FIG. 5 is a cross-sectional view taken along line B-B in FIG. 4.

An embodiment of the present disclosure provides a conjoined key structure 100. As shown in FIG. 1 to FIG. 3, the conjoined key structure includes a support frame 1 with an accommodating groove 10, a first piezoelectric transducer 2 and a second piezoelectric transducer 3 that are fixedly accommodated in the accommodating groove 10 and spaced from each other, a pressure sensor 4 fixedly accommodated in the accommodating groove 10 and located between the first piezoelectric transducer 2 and the second piezoelectric transducer 3, and a key 5 arranged on the support frame 1 in a covering manner and covering the accommodating groove 10. The key 5 and the support frame 1 are elastically connected. Two opposite sides of the first piezoelectric transducer 2 respectively abut against the support frame 1 and the key 5. Two opposite sides of the second piezoelectric transducer 3 respectively abut against the support frame 1 and the key 5. Two opposite sides of the pressure sensor 4 respectively abut against the support frame 1 and the key 5.

Specifically, the support frame 1 includes a base plate 11 and an extending portion 12 that is formed by protruding and extending from the periphery of the base plate 11 to a direction close to the key 5. The extending portion 12 and the base plate 11 are jointly enclosed to form the accommodating groove 10, and two ends of the key 5 are respectively fixed to one side of the extending portion 12 far away from the base plate 11 and are elastically connected to the extending portion 12.

In this embodiment, a connecting hole 113 extending through the base plate can be further formed at two ends of the base plate 11, respectively, facilitating installation and fixation to a corresponding electronic device.

Specifically, the first piezoelectric transducer 2 includes a flat piezoelectric ceramic plate 21, as well as a first piezoelectric plate 22 and a second piezoelectric plate 23 that are respectively arch-shaped or cymbal-shaped. The first piezoelectric plate 22 and the second piezoelectric plate 23 are respectively located at upper and lower sides of the piezoelectric ceramic plate 21; two ends of the first piezoelectric plate 22 are respectively fixed to two ends of the piezoelectric ceramic plate 21; a middle region of the first piezoelectric plate 22 is fixed to one side of the support frame 1 close to the key 5; two ends of the second piezoelectric plate 23 are respectively fixed to two ends of the piezoelectric ceramic plate 21; and a middle region of the second piezoelectric plate 23 is fixed to one side of the key 5 close to the support frame 1.

In this embodiment, the first piezoelectric plate 22 and the second piezoelectric plate 23 are respectively arc-shaped. Certainly, the first piezoelectric plate 22 and the second piezoelectric plate 23 may also be designed to be cymbal-shaped according to actual requirements.

Specifically, one side of the support frame 1 close to the key 5 protrudes to form a first strip-shaped support block 111; one side of the first strip-shaped support block 111 close to the key 5 protrudes to form a first limiting column 112; a first limiting hole 221 extending through the first piezoelectric plate is arranged at a position of the first piezoelectric plate 22 corresponding to the first limiting column 112; and the first limiting column 112 is inserted into the first limiting hole 221. Such design can enhance a fixation effect between the first piezoelectric plate 22 and the support frame 1 and can achieve a position limitation function.

In this embodiment, the first strip-shaped support block 111 is formed by protruding from one side of the base plate 11 close to the key 5.

Specifically, one side of the key 5 close to the support frame 1 protrudes to form a second strip-shaped support block 511; one side of the second strip-shaped support block 511 close to the support frame 1 protrudes to form a second limiting column 512; a second limiting hole 231 extending through the second piezoelectric plate is arranged at a position of the second piezoelectric plate 23 corresponding to the second limiting column 512; and the second limiting column 512 is inserted into the second limiting hole 231. Such design can enhance a fixation effect between the second piezoelectric plate 23 and the key 5 and can achieve a position limitation function.

In this embodiment, the second piezoelectric transducer 3 is the same as the first piezoelectric transducer 2 in structure, to be specific, the second piezoelectric transducer 3 also includes a piezoelectric ceramic plate as well as a first piezoelectric plate and a second piezoelectric plate. In addition, the first piezoelectric plate and the second piezoelectric plate in the second piezoelectric transducer 3 are fixed in a same manner as the first piezoelectric plate 22 and the second piezoelectric plate 23 in the first piezoelectric transducer 2. Certainly, the structure of the second piezoelectric transducer 3 may also be designed in other forms according to actual requirements.

In this embodiment, the pressure sensor 4 is arranged in a manner of facing a middle position of the key 5; and the first piezoelectric transducer 2 and the second piezoelectric transducer 3 are arranged at an equal interval on two opposite ends of the pressure sensor 4.

A plurality of pressure sensors 4 are provided; the plurality of pressure sensors 4 are arranged at an equal interval; and the plurality of pressure sensors 4 are all located between the first piezoelectric transducer 2 and the second piezoelectric transducer 3.

By such design, the pressure sensor 4 can better acquire data changes of pressing forces of fingers and data changes of position and distance in touch actions, improving recognition accuracy and consistency of the conjoined key structure 100.

In this embodiment, the pressure sensor 4 is any one of piezoelectric sensor, strain sensor, optical sensor, magnetic sensitive sensor, capacitive sensor, inductive sensor, and proximity sensor. By using such type of pressure sensor 4, different gestures such as a sliding operation of users can be recognized better.

Specifically, the key 5 includes a strip-shaped body portion 51, two elastic portions 52 that respectively sinuously bend and extend from two ends of the strip-shaped body portion 51 and are fixed to the support frame 1, and an abutment portion 53 that protrudes and extends from a position of the strip-shaped body portion 51 corresponding to the pressure sensor 4 to a direction close to the pressure sensor 4; and the abutment portion 53 abuts against the pressure sensor 4.

In this embodiment, the second strip-shaped support block 511 is formed by protruding and extending from one side of the strip-shaped body portion 51 close to the support frame 1.

The conjoined key structure 100 in the embodiments of the present disclosure is additionally provided with the pressure sensor 4 between the first piezoelectric transducer 2 and the second piezoelectric transducer 3, such that the pressure sensor 4 can acquire data changes of pressing forces of fingers and data changes of position and distance in touch actions and can accurately determine the touch actions of the fingers in cooperation with auxiliary signals acquired by the first piezoelectric transducer 2 or the second piezoelectric transducer 3, improving recognition accuracy and consistency of the conjoined key structure 100, reducing interference between two conjoined keys 5, and improving an experiential effect of the conjoined key structure when applied to corresponding electronic devices.

Second Embodiment

An embodiment of the present disclosure provides an electronic device 200. As shown in FIG. 1 to FIG. 5, the electronic device includes a housing 201 and the conjoined key structure 100 in the First Embodiment, where the key 5 extends through a side surface of the housing 201 to be exposed outside.

The electronic device 200 is a mobile phone, a watch, a tablet computer, or the like.

In this embodiment, a mounting hole 202 is formed on the side surface of the housing 201; the support frame 1 is fixed to the housing 201; and the key 5 extends through the mounting hole 202 to be exposed outside.

The electronic device 200 in this embodiment includes the conjoined key structure 100 in the foregoing First Embodiment. Therefore, the electronic device can also achieve the technical effects achieved by the conjoined key structure 100 in the foregoing First Embodiment. This is not described in detail herein.

It should be noted that the embodiments described with reference to the accompanying drawings are merely used for illustrating the present disclosure rather than limiting the scope of the present disclosure. A person of ordinary skill in the art should understand that any modification or equivalent replacement made without departing from the spirit and principle of the present disclosure shall fall within the protection scope of the present disclosure. In addition, unless the context otherwise indicates, words in the singular form also include the words in the plural form, and vice versa. Besides, unless otherwise specified, all or a part of any embodiment may be used in conjunction with all or a part of any other embodiment.

What is claimed is:

1. A conjoined key structure, comprising:

a support frame with an accommodating groove;

a first piezoelectric transducer and a second piezoelectric transducer that are fixedly accommodated in the accommodating groove and spaced from each other;

a pressure sensor fixedly accommodated in the accommodating groove and located between the first piezoelectric transducer and the second piezoelectric transducer; and a key arranged on the support frame in a covering manner and covering the accommodating groove;

wherein the key and the support frame are elastically connected;

two opposite sides of the first piezoelectric transducer respectively abut against the support frame and the key;

two opposite sides of the second piezoelectric transducer respectively abut against the support frame and the key; and two opposite sides of the pressure sensor respectively abut against the support frame and the key.

2. The conjoined key structure according to claim 1, wherein the pressure sensor is arranged in a manner of facing a middle position of the key, and the first piezoelectric transducer and the second piezoelectric transducer are arranged at an equal interval on two opposite ends of the pressure sensor.

3. The conjoined key structure according to claim 2, wherein the pressure sensor is any one of piezoelectric sensor, strain sensor, optical sensor, magnetic sensitive sensor, capacitive sensor, inductive sensor, and proximity sensor.

4. The conjoined key structure according to claim 1, wherein the first piezoelectric transducer comprises a flat piezoelectric ceramic plate, as well as a first piezoelectric plate and a second piezoelectric plate that are respectively arch-shaped or cymbal-shaped; the first piezoelectric plate and the second piezoelectric plate are respectively located at upper and lower sides of the piezoelectric ceramic plate; two ends of the first piezoelectric plate are respectively fixed to two ends of the piezoelectric ceramic plate; a middle region of the first piezoelectric plate is fixed to one side of the support frame close to the key; two ends of the second piezoelectric plate are respectively fixed to two ends of the piezoelectric ceramic plate; a middle region of the second piezoelectric plate is fixed to one side of the key close to the support frame; and the second piezoelectric transducer is the same as the first piezoelectric transducer in structure.

5. The conjoined key structure according to claim 4, wherein the side of the support frame close to the key protrudes to form a first strip-shaped support block; one side of the first strip-shaped support block close to the key protrudes to form a first limiting column; a first limiting hole extending through the first piezoelectric plate is arranged at a position of the first piezoelectric plate corresponding to the first limiting column; the first limiting column is inserted into the first limiting hole; the side of the key close to the support frame protrudes to form a second strip-shaped support block; one side of the second strip-shaped support block close to the support frame protrudes to form a second limiting column; a second limiting hole extending through the second piezoelectric plate is arranged at a position of the second piezoelectric plate corresponding to the second limiting column; and the second limiting column is inserted into the second limiting hole.

6. The conjoined key structure according to claim 1, wherein the support frame comprises a base plate and an extending portion that is formed by protruding and extending from a periphery of the base plate to a direction close to the key; the extending portion and the base plate are jointly enclosed to form the accommodating groove; and two ends of the key are respectively fixed to one side of the extending portion far away from the base plate and are elastically connected to the extending portion.

7. The conjoined key structure according to claim 1, wherein the key comprises a strip-shaped body portion, two elastic portions that respectively sinuously bend and extend from two ends of the strip-shaped body portion and are fixed to the support frame, and an abutment portion that protrudes and extends from a position of the strip-shaped body portion corresponding to the pressure sensor to a direction close to the pressure sensor; and the abutment portion abuts against the pressure sensor.

8. An electronic device, comprising a housing and the conjoined key structure according to claim 1; and the key extends through a side surface of the housing to be exposed outside.

9. The electronic device according to claim 8, wherein a mounting hole is formed on the side surface of the housing; the support frame is fixed to the housing; and the key extends through the mounting hole to be exposed outside.

* * * * *